3,499,034
HYDROGENATION OF AROMATIC NITRO COMPOUNDS

Raul A. Gonzalez, Newark, Del., assignor to E. I. du Pont de Nemours and Company, Wilmington, Del., a corporation of Delaware
No Drawing. Filed Aug. 1, 1966, Ser. No. 569,103
Int. Cl. C07c 85/10
U.S. Cl. 260—580        7 Claims

ABSTRACT OF THE DISCLOSURE

This invention relates to the hydrogenation of aromatic nitro compounds, and more particularly to a continuous, one-stage process for the hydrogenation of aromatic nitro compounds to produce a yield of the order of about 99% of theory of substantially pure aromatic amine.

BACKGROUND OF THE INVENTION

It is known that aromatic nitro compounds are reduced to the corresponding amine by the formation of nitroso and hydroxyl amines as intermediates. A substantial amount of reaction also takes place by condensation of these intermediates with the starting nitro compound and with themselves to form azoxy, azo and hydrazo derivatives which are tar-like substances. These tars can be reduced to the desired amine during the hydrogenation but this reduction goes with difficulty and thus the formation of these tars considerably slows down the reaction. Accordingly, hydrogenation of aromatic nitro compounds has heretofore required a system which provides a rather large residence time, and purification of the product has been necessary to recover the desired amine free of the byproduct tar.

Continuous processes for the hydrogenation of aromatic nitro compounds have been described. These processes are generally characterized by a two-stage reactor system and the formation of a substantial amount of tar.

In U.S. Patent 2,619,503, R. G. Benner and A. C. Stevenson describe the continuous hydrogenation of aromatic dinitro compounds at 40° to 100° C. and atmospheric to somewhat elevated pressures in the presence of a platinum or palladium catalyst while agitating with a power input of 20 to 60 horsepower per 1000 gallons of dinitro compound. A two-stage reactor system is described for operating the process continuously. In the examples residence times of 8 to 10 hours are used in the batch hydrogenation of dinitrobenzene and dinitrotoluene to give yields of about 91 to 94% of theory.

In U.S. Patent 3,213,141, Graham et al. describe a continuous process for the hydrogenation of dinitrotoluene in a single reactor having a residence time of 10 hours. The reaction is carried out in the presence of a platinum, palladium or Raney nickel catalyst at temperatures of 20° to 100° C. and pressures of atmospheric to 150 p.s.i.g. The process results in the formation of about 9% tar and requires an elaborate recovery system to provide the desired diamine in substantially pure form.

Experience in the past has shown that the hydrogenation of halogenated aromatic nitro compounds should be considered separately from the hydrogenation of nonhalogenated aromatic nitro compounds. This is due mainly to the problem of dehalogenation which occurs during hydrogenation of the halogenated material. The extent of such dehalogenation is influenced by process conditions, such as temperature, pressure, the type and amount of catalyst, the use of solvents, and the like. It is generally acknowledged that the presence of palladium is detrimental since it causes excessive dehalogenation as indicated in U.S. Patents 3,073,865 to L. Spiegler, 3,145,231 to J. R. Kosak and 3,148,217 to Freyermuth et al. Accordingly, the hydrogenation of halogenated aromatic nitro compounds is normally more expensive than that of nonhalogenated aromatic nitro compounds since it requires a catalyst such as platinum which is more expensive than palladium.

DESCRIPTION OF THE INVENTION

It has now been discovered that aromatic nitro compounds can be hydrogenated to provide yields of the order of about 99% of theory of substantially pure aromatic amine by a continuous, one-stage process which comprises hydrogenating an aromatic nitro compound of the formula

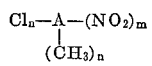

wherein A is a benzene or naphthalene nucleus, $n$ is 0 to 2, and $m$ is 1 to 2, in an autoclave agitated with a power input of 10 to 60 horsepower per 1000 gallons of reaction mass at a temperature of 80° to 200° C. and a hydrogen pressure of 200 to 1200 p.s.i.g. in the presence of a carbon-supported platinum or palladium catalyst at a feed weight ratio of nitro compound to catalyst metal of 10,000 to 150,000:1 while continuously adding the aromatic nitro compound at a rate such that the concentration of aromatic nitro compound is less than about 0.5% by weight of the organic content of the reaction mass and recovering substantially pure aromatic amine as the product of the process.

The essential feature of the present invention is that the concentration of the aromatic nitro compound be less than about 0.5% by weight of the organic content of the reaction mass. Quite unexpectedly, it has been found that by maintaining this extremely low concentration of starting material, the reaction rate is dramatically increased, whereby the reaction is conveniently carried out in a single reaction stage having a relatively short residence time. Moreover, the formation of tar is so greatly diminished that yields of the order of about 99% of theory of the desired amine are obtained in sufficiently pure form that the product can be used directly without purification in most cases.

Although it is not intended that this invention be limited to any particular theory, it is believed that by keeping the concentration of aromatic nitro compound extremely low, substantially no azoxy, azo or hydrazo derivatives are formed which essentially eliminates this difficult route to the desired amine with a corresponding increase in the overall reaction rate. Moreover, reduction in the formation of these tar derivatives provides a substantially more active catalyst with the result that the reaction rate is further increased whereby considerably less catalyst is required to maintain a high reaction rate.

This process has the further advantage that palladium catalysts can be used for the hydrogenation of halogenated aromatic nitro compounds without any substantial amount of dehalogenation taking place. Heretofore it has been necessary to avoid the use of palladium catalyst in the hydrogenation of these compounds. However, in accordance with the present invention, no difference has been observed between the use of platinum and palladium catalysts. Accordingly, palladium catalysts which are much cheaper than platinum catalysts may advantageously be used.

The aromatic nitro compounds which may be used as starting materials in the process of this invention are those of the formula:

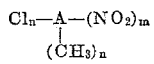

wherein A is a benzene or naphthalene nucleus, $n$ is 0 to to 2 and $m$ is 1 or 2. Typical examples of suitable aromatic nitro compuonds include nitrobenzene, ortho-, meta- and para-dinitrobenzenes, ortho-, meta-, and para-nitrotoluenes, dinitrotoluenes, nitronaphthalenes, ortho-, meta- and para-floronitobenzenes, 1-nitro - 3,4 - dichlorobenzene, 1-nitro-2,5-dichlorobenzene, 4-chloro-2-nitrotoluene, 6-chloro-2-nitroluene, 2-chloro - 4 - nitrotoluene and 4-chloro-3-nitrotoluene.

The reaction is carried out at temperatures of 80° to 200° C. At temperatures below about 80° C., the reaction rate is slow, while at temperatures above about 200° C. mechanical difficulties in maintaining such temperatures may be encountered, although the concentration of tars decreases. Also, in the case of chlorinated aromatic nitro compounds, higher temperatures increase the tendency toward dechlorination. Preferably, the temperature is about 90° to 180° C.

The pressure should be maintained in the range of about 200 to 1200 p.s.i.g. by charging hydrogen at these pressures. At pressures below about 200 p.s.i.g., the reaction rate is greatly reduced at the desirable low catalyst concentrations specified in accordance with this invention. Above about 1200 p.s.i.g. the mechanical problems usually associated with high pressures may exceed any advantages which may be obtained by further increases in pressure. Preferably the pressure is about 350 to 800 p.s.i.g.

In order to maintain the fast reaction rate obtained in accordance with this invention, the reaction medium must be vigorously agitated with a power input of about 10 to 60 horsepower per 1000 gallons of reaction medium. At an input of less than about 10 horsepower, there is considerable decrease in the reaction rate. The use of greater than 60 horsepower may introduce mechanical difficulties not compensated for by further improvement in reaction rate. Preferably, the power input is about 10 to 40 horsepower per 1000 gallons.

The catalyst may be platinum, palladium or a combination of platinum and palladium deposited on a carbon support which may be porous or non-porous. Preferably, the catalytic metal is deposited on a nonporous or oleophilic carbon. Such catalysts are described by D. P. Graham and L. Spiegler in U.S. Patent 2,823,235. The noble metal may be activated by the presence of promoters or activators such as minor amounts or certain metals, metal oxides, hydroxides or carbonates. Examples of suitable promoters include the oxides and hydroxides of iron, nickel, cobalt, magnesium, aluminum, manganese, chromium, vanadium and tungsten.

The catalyst may be prepared by known methods such as those described in the Graham and Spiegler patent. For ease in preparation it is preferable to prepare the catalyst at high concentration loading of metal on carbon, for example 1 to 10%, and subsequently add or mix more carbon with the concentrate to produce a catalyst having a loading of about 0.1 to 1% metal based on the weight of the support.

In accordance with the present invention, only small amounts of catalyst are required thus further increasing the economy of the process. The feed ratio of aromatic nitro compound to metal catalyst is generally about 10,000 to 150,000:1. Amounts of catalyst in excess of nitrocompound to catalyst ratio of about 10,000:1 provide no increased benefit and considerably increase the cost of the process. In the case of chlorinated aromatic nitro compounds, larger amounts of catalyst cause dechlorination as indicated by L. Spiegler in U.S. Patent 3,073,865. Amounts of catalyst smaller than 150,000:1 give considerably reduced reaction rates. Preferably, nitro compound to catalyst ratios of about 25,000 to 125,000:1 are employed.

The critical feature of this invention is the continuous introduction of the aromatic nitro compound at a rate such that its concentration is less than about 0.5% of the organic content of the reaction mass. The presence of more than about 0.5% of aromatic nitro compounds results in the formation of a significant amount of azoxy, azo and hydrazo derivatives which considerably slows down the reaction rate and increases the amount of tars present in the final product. Preferably the concentration of the aromatic nitro compound is about 0.2 to 0.02% and in some cases may be as low as about 0.001%.

The reaction is conveniently carried out in a baffled autoclave equipped with a stirring mechanism having a power input of at least 10 horsepower per 1000 gallons of reaction mass. To start up the continuous process, the autoclave is filled to slightly less than capacity, for example about ⅔ full, with a heel of a previously obtained product.

The nitro compound is fed continuously into the autoclave by suitable means. Hydrogen is pressured into the alutoclave and dispersed into the reaction mass by any suitable means such as by sparger, while maintaining the specified pressure. The volume of the reaction mass in the autoclave is maintained at the initial level by intermittently or continuously withdrawing the product including the catalyst slurried in it. A slurry of fresh catalyst or a mixture of fresh and recycled catalyst is introduced into the reaction mass intermittently or continuously, either separately or together with the nitro compound.

The product stream containing some catalyst is filtered to remove catalyst from the amine product. The filtered product is of sufficiently high purity that it can be used directly in any commercial process without further chemical purification. The catalyst recovered from the product stream may be recycled or mixed with fresh catalyst and used again.

The following examples, illustrating the novel process disclosed herein for hydrogenating aromatic nitro compounds, are given without any intention that the invention be limited thereto. All parts and percentages are by weight.

EXAMPLE 1

Hydrogenation of 1-nitro-3,4-dichlorobenzene (A) The reactor used was a 1-gallon autoclave, provided with a hydrogen sparger, baffles, and a stirrer providing a power input of 32 horsepower per 1000 gallons while rotating at 980 r.p.m. The reactor was charged with 2820 grams of 1-nitro-3,4-dichlorobenzene in the presence of 96 grams of a catalyst slurry made by mixing 88 parts of water, 28 parts morpholine and 5 parts of a mixture derived from 80 parts of water, 19 parts of Shawinigan Black carbon and 1 part of platinum. The batch hydrogenation was carried out at a hydrogen pressure of 450 p.s.i.g., and at a temperature of 100° C. These conditions were also used for the continuous process. At the beginning of the continuous operation the reactor contained 2900 grams of the product of the batch hydrogenation.

To start the continuous process, 1-nitro-3,4-dichlorobenzene was fed continuously to the reactor through a positive displacement pump, at a feed rate of 444 grams per hour. Every 40 minutes after starting the feed, the volume of medium in the autoclave was restored to the initial level by venting the reaction product, including the catalyst slurried in it, through a dip leg placed at the appropriate level inside the autoclave. At the same time 10 grams of the catalyst slurry described above was introduced by displacement with hydrogen at a pressure above 450 p.s.i.g. The feed ratio of the nitro compound to the metal catalyst was therefore 70,000:1. Once the system was at steady state, the residence time was 7 hours.

Gas chromatographic analysis of the organic phase, after decanting the aqueous phase, was as follows:

| | Percent |
|---|---|
| 3,4-dichloroaniline | 99.4 |
| 1-nitro-3,4-dichlorobenzene | <0.01 |
| 2,3- and 2,5-dichloroanilines | 0.5 |
| p-Chloroaniline | 0.12 |
| Aniline | 0.02 |
| Hydrazo compounds | <0.01 |

(B) The details of Example 1(A) above were repeated with the exception that the 1-nitro-3,4-dichlorobenzene feed contained 0.47% p-chloronitrobenzene and the catalyst was composed of palladium and platinum promoted with iron. The catalyst was made by mixing 88 parts of water, 28 parts of morpholine, and 5 parts of a mixture derived from 80 parts of water, 19 parts of Shawinigan Black carbon, 0.9 part of palladium, 0.1 part of platinum and 1.0 part of $Fe^{+++}$ (as hydroxide). The residence time was 7 hours.

Gas chromatographic analysis of the organic phase, after decanting the aqueous phase, showed the presence of the following:

| | Percent |
|---|---|
| 3,4-dichloroaniline | 99.35 |
| 1-nitro-3,4-dichlorobenzene | 0.03 |
| Trichloroanilines | 0.3 |
| p-Chloroaniline [1] | 0.25 |
| Aniline | 0.05 |
| Hydrazo compounds | 0.02 |

[1] Discounting the 0.47% p-chloroaniline derived from the p-chloronitrobenzene charged.

EXAMPLE 2

Hydrogenation of α-nitronaphthalene

The procedure described in Example 1(A) above was repeated using a hydrogen pressure of 500 p.s.i.g., a temperature of 150° C., a stirrer power input of 28 horsepower per 1000 gallons, a feed ratio of α-nitronaphthalene to catalyst metal of 35,000:1 at 488 grams per hour of α-nitronaphthalene and a catalyst slurry obtained by mixing 0.45 part of palladium, 0.05 part of platinum, 0.50 part of $Fe^{+++}$ (as hydroxide), 9.5 parts of Shawinigan Black carbon and 640 parts of water. The residence time was 5 hours.

The product stream, after catalyst filtration and drying, had the composition:

| | | |
|---|---|---|
| α-Naphthylamine (by nitrite determination) | % | 99.8 |
| α-Nitronaphthalene | % | 0.05 |
| Freezing point | ° C. | 48.0 |

EXAMPLE 3

Hydrogenation of o-nitrotoluene

The procedure described in Example 1(A) was repeated using the iron promoted mixed palladium-platinum catalyst described in Example 2 and the following conditions in two separate runs.

| | Run | |
|---|---|---|
| | 1 | 2 |
| H₂ pressure, p.s.i.g. | 500 | 500 |
| Temperature, ° C. | 180 | 180 |
| Power input, HP/1,000 gal. | 30 | 10 |
| o-Nitrotoluene/noble metal, feed ratio | 113,000/1 | 75,000/1 |
| Feed rate, grams/hr. | 581 | 581 |
| Residence time, hr. | 4 | 4 |

The product stream before catalyst filtration had the analysis:

o-Toluidine purity, by nitrite determination, Run 1, >99%; Run 2, >99%; and o-Nitrotoluene, Run 1, 0.04%; Run 2, 0.06%.

EXAMPLE 4

Hydrogenation of m-dinitrobenzene

The details of Example 1(A) were repeated using the iron promoted mixed palladium-platinum catalyst of Example 2 and the following conditions:

| | | |
|---|---|---|
| Hydrogen pressure p.s.i.g. | | 500 |
| Temperature | ° C. | 110 |
| Power input | HP/1000 gal. | 30 |
| Dinitrobenzene/noble metal feed ratio | | 47,200:1 |
| Dinitrobenzene feed rate | grams/hr. | 544 |
| Residence time | hr. | 5.5 |

The product stream before catalyst filtration had the composition:

| | Percent |
|---|---|
| m-Phenylenediamine | 99 |
| Dinitrobenzene | 0.20 |
| Tars | 0.8 |

It has been shown in the foregoing examples that by using the specified conditions of this invention, a continuous process is provided for the substantially complete conversion of aromatic nitro compounds to substantially pure amines in a single-stage reaction vessel. Thus, the process is most economical in equipment and materials cost. The unusually high purity of the amine product obtained enables it to be used, as such, without further chemical treatment in most commercial processes. In addition, the process is more economically attractive in that catalysts containing palladium may be used to hydrogenate chlorinated aromatic nitro compounds without excessive dechlorination.

The embodiments of the invention in which an exclusive property or privilege is claimed are defined as follows:

1. A continuous, one-stage process for the hydrogenation of aromatic nitro compounds which comprises hydrogenating an aromatic nitro compound of the formula

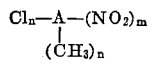

wherein A is a benzene or naphthalene nucleus, $n$ is 0 to 2 and $m$ is 1 or 2 by agitating said nitro compound with a power input of 10 to 60 horsepower per 1000 gallons of reaction mass at a temperature of 80° to 200° C. and a hydrogen pressure of 200 to 1200 p.s.i.g. in the presence of a carbon-supported platinum or palladium catalyst at a feed weight ratio of nitro compound to catalyst metal of 10,000 to 150,000:1 while continuously adding the aromatic nitro compound at a rate such that the concentration of aromatic nitro compound at steady state conditions is less than 0.5% by weight of the organic content of the reaction mass and recovering substantially pure aromatic amine as the product of the process.

2. The process of claim 1 in which the agitation input is 10 to 40 horsepower per 1000 gallons, the pressure is 350 to 800 p.s.i.g., the temperature is 90° to 180° C., the ratio of nitro compound to catalyst metal is 25,000 to 120,000:1 and the concentration of the aromatic nitro compound is less than 0.2% of the organic content of the reaction mass.

3. The process of claim 2 in which 3,4-dichloronitrobenzene is hydrogenated in the presence of a carbon supported palladium catalyst.

4. The process of claim 2 in which m-dinitrobenzene is hydrogenated in the presence of a carbon supported palladium catalyst.

5. The process of claim 2 in which the aromatic nitro compound is o-nitrotoluene.

6. The process of claim 2 in which the aromatic nitro compound is α-nitronaphthalene.

7. The process of claim 2 in which the aromatic nitro compound is o-chloronitrobenzene.

References Cited

UNITED STATES PATENTS 2,619,503   11/1952   Benner et al.
3,145,231   8/1964   Kosak.

CHARLES B. PARKER, Primary Examiner
R. L. RAYMOND, Assistant Examiner

U.S. Cl. X.R.

252—472; 260—689